May 21, 1963  L. GIULIETTI  3,090,628
BEARING WITH FLEXIBLE SEALING MEANS
Filed April 8, 1957  2 Sheets-Sheet 1

May 21, 1963  L. GIULIETTI  3,090,628
BEARING WITH FLEXIBLE SEALING MEANS
Filed April 8, 1957  2 Sheets-Sheet 2

3,090,628
BEARING WITH FLEXIBLE SEALING MEANS
Luciano Giulietti, Turin, Italy, assignor to RIV Officine di Villar Perosa Societa per Azioni, Turin, Italy
Filed Apr. 8, 1957, Ser. No. 651,320
Claims priority, application Switzerland June 14, 1956
3 Claims. (Cl. 277—94)

This invention relates to oil-tight bearings of the type provided with seals consisting of an annular metallic screen connected to a diaphragm made of rubber or a similar oil-resisting material; the outer edge of this diaphragm is fixed in a radial groove of the outer ring of the bearing, while its inner edge slides over a chamfer on the inner ring of the bearing.

According to this invention, the bearing has the peculiarity that said diaphragm, in its portion at the chamfer where sliding occurs, is provided with at least two ring-shaped ridges or lips, which adhere to the chamfer surface by sliding over it, thus providing a means of sealing on the inner ring, to prevent lubricant leakages from the bearing inside, as well as dust and foreign matters from entering into the bearing.

Some embodiments of the invention will now be described by way of example with reference to the accompanying drawings in which.

Figure 1:
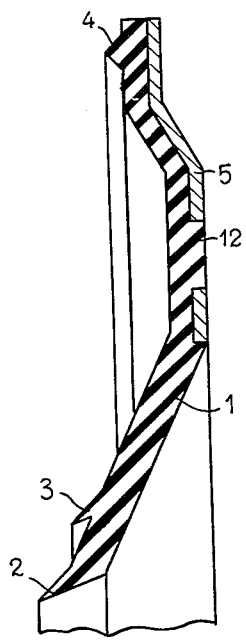
FIG. 1 illustrates, on enlarged scale and in partial axial section, the seal consisting of a metallic screen connected to a diaphragm made of a resilient material, for instance rubber; the seal is shown prior to being installed in a bearing.

In the drawings, reference 1 indicates the diaphragm made of a resilient material, for instance of oil-resisting rubber, and which internally is ended by a tapered lip 2, while in the area of sliding it has one or more annular tapered lips 3.

Along its outer edge the diaphragm 1 is provided with a rib 4, which is elastically pressed against a suitable seat in the bearing outer ring when the seal is mounted in the bearing.

To the resilient diaphragm 1 a metallic ring 5 is firmly bonded by curing, for instance, thus forming an integral unit with the diaphragm itself; the outside diameter of this ring is equal to the outside diameter of the resilient diaphragm 1, whilst its inside diameter is substantially larger than the inside diameter of the resilient diaphragm, and therefore the inside edge of the latter is freely flexible in order to suit the curvature of the inner ring of the rolling bearing, for which the seal has to provide a good tightness.

Figure 2:
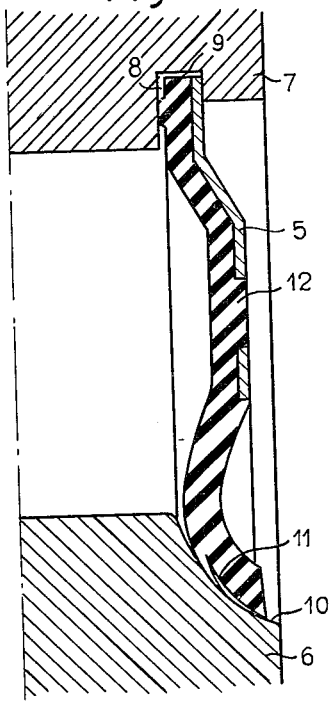
FIG. 2 illustrates, on the same scale as FIGURE 1 and in partial axial section as well, a bearing with the seal installed.

Metallic ring or screen 5 is made, preferably, of a thin metal sheet and may be completely flat or shaped in such a manner that its inner portion nearer to the seal axis is situated in a radial plane spaced from that wherein its outer edge portion is contained, both parts being connected by a truncated-cone surface as shown in FIGURES 1 and 2, respectively.

This type of seal is especially suitable for bearings of small axial thickness.

Figure 3:
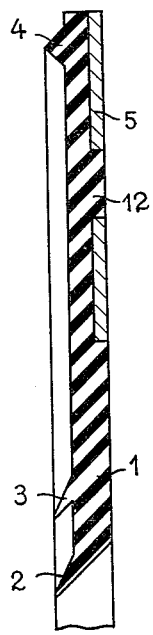
FIG. 3 illustrates, in a section similar to that in FIG. 1, a seal having different constructive features.
Figure 4:
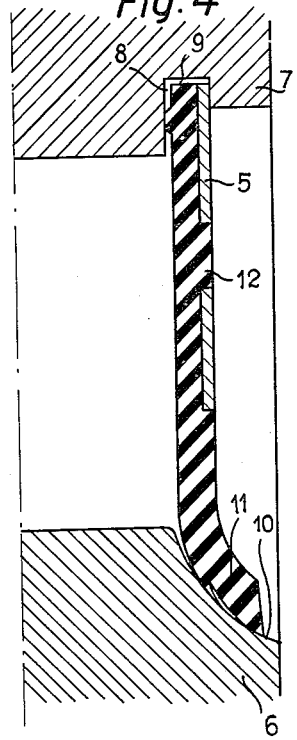
FIGURE 4 illustrates, on the same scale and in partial axial section, a rolling bearing with the seal of the type shown in FIGURE 3, in position.

As shown in FIGURES 2 to 4, in a standard bearing comprising an inner ring 6 and an outer ring 7, the seal, consisting of the resilient diaphragm 1 and of a metallic screen 5 firmly attached to each other, is fitted in an inner annular groove 8 in the outer bearing ring 7, in such a manner as to maintain the diaphragm rib 4 elastically pressed against the radial inner side of said annular groove, in order to ensure good tightness against oil leakages between said groove side and the diaphragm 1, as well as to help in keeping the seal in position in the groove 8.

The outside diameter of the seal is chosen so that it is smaller than the diameter of the bottom of the inner annular groove 8, which is provided in the outer ring of the bearing to be fitted with the seal.

This arrangement allows the packing to be simply a force fit between the opposed radial shoulders of groove 8 made in the bearing outer ring 7, as a result of the compression of circular rib 4 provided along the upper edge of the rubber diaphragm 1, without any radial stress to bearing ring 7, owing to the fact that outside diameter of the metallic screen 5 is slightly smaller than that of the groove; a small clearance 9 (FIGURES 2 and 4) is always left between the outside edge of seals 1, 5 and the inside surface or bottom of the groove 8.

On the outside edge of the inner bearing ring 6 a large concave chamfer 10 is provided, to which the diaphragm fits elastically through the tapered projection 2 and the annular projection or projections 3. When the seal is mounted, these projections, being obliquely set and tapered, bear very well on the concave surface of the chamfer and slide with slight friction over it, thus giving a very satisfactory sealing against the inner ring, which may be improved by a slight extra pressure from outside, if required.

Sealing obtained by the sliding contacts between the lower portion of the rubber diaphragm 1 and the special chamfers in the inner bearing ring 6 is more efficient as, owing to the deformation of the diaphragm, the two annular lips 2 and 3 provided along the lower edge thereof are disposed so as to form two annular sliding surfaces with an intermediate space 11, which avoids continuity in the contact area between the rubber diaphragm 1 and chamber 10 in the bearing inner ring 6, thus preventing easy access of foreign matters inside the bearing and also the leakage of oil split from grease by splashing.

Any loss of lubricant may be compensated without removing the seal; it is sufficient to punch the diaphragm itself through port 12 in the screen with a hypodermic needle coupled to a screw syringe; the screen may also have more than one port in order to improve the adhesion between the screen and the diaphragm. The hole through diaphragm 1 closes due to the natural elasticity of the rubber as soon as the needle has been removed.

In FIGURES 5 to 9 the application of the diaphragm to different bearing types is shown.

Figure 5:
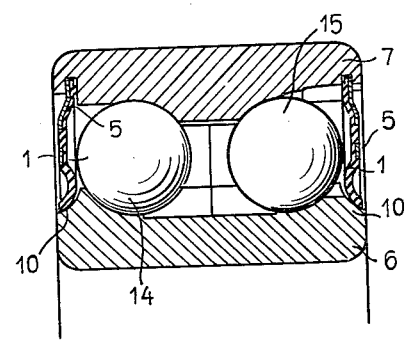
FIGURE 5 illustrates, in partial axial section, an obliquely-set double-row ball bearing provided with a seal according to FIGURE 1.

For instance, in FIGURE 5 the invention is applied to an obliquely-set double-row (14 and 15) ball bearing.

Figure 6:
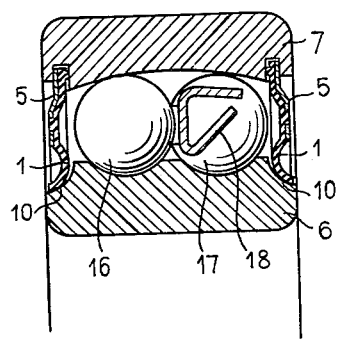
FIGURE 6 illustrates, in partial axial section, an orientable double-row ball bearing provided with a seal of the type shown in FIGURE 1.

In FIGURE 6 the invention is applied to an orientable double-row ball bearing, wherein the balls 16 and 17 are spaced by retainers 18.

Figure 7:
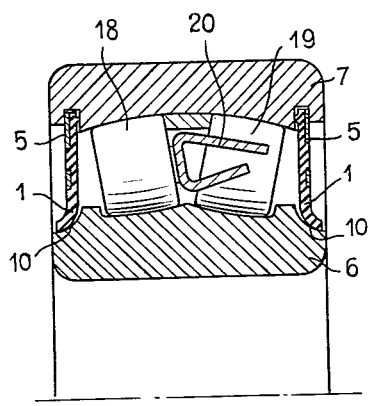
FIGURE 7 illustrates, in partial axial section, an orientable double-row roller bearing provided with a seal of the type shown in FIGURE 3.

The invention may be applied also to orientable roller bearings either of single or double-row type, this application being shown in FIGURE 7, wherein the bearing embodies a double row of rollers 18 and 19 spaced by retainers 20.

Figure 9:
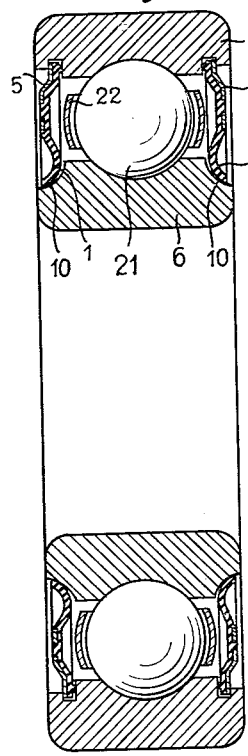
FIGURE 9 illustrates, in axial section, a ball bearing according to FIGURE 8, but axially shorter and provided with a seal as shown in FIGURE 1.
Figure 8:
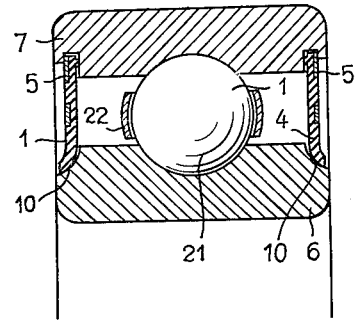
FIGURE 8 illustrates, in axial section, a radial ball bearing provided with a seal of the type shown in FIGURE 3.

In FIGURES 8 and 9 the invention is shown as applied to bearings with a single-row of balls 21 which are guided in retainers 22; the bearings have different axial dimensions.

What I claim is:

1. In an oil-tight bearing having a first bearing member and a concentric second bearing member, with said first bearing member being formed with a radially-extending annular groove having a bottom wall and first and second side walls, and said second bearing member being formed with a sloping annular surface, a bearing seal unit disposed between said bearing members, said seal unit being formed with an annular elastic body having a rigid annular reinforcement disposed along one side of its axially outer portion, all of the radially outer portions of said body and said reinforcement substantially coinciding and extending into said groove but terminating at a distance short of said bottom wall, whereby an annular clearance between said bottom wall and said seal unit is established and maintained, the radially inner portion of said elastic body which is free from said reinforcement overlying and bearing against said sloping surface, said reinforcement bearing against one of the side walls of said groove and said body resiliently bearing against the other side wall of said groove, whereby said seal unit does not impose a load in a radial direction upon said first bearing member.

2. In an oil-tight bearing having a first bearing member and a concentric second bearing member, with said first bearing member being formed with a radially-extending annular groove having a bottom wall and first and second side walls, and said second bearing member being formed with a sloping annular surface, a bearing seal unit disposed between said bearing members, said seal unit being formed with an annular elastic body having a rigid annular reinforcement disposed along one side of its axially outer portion, said body and said reinforcement being dimensioned in thickness such that the unit has a substantially uniform thickness substantially throughout its radial length between said members, all of the radially outer portions of said body and said reinforcement substantially coinciding and extending into said groove but terminating at a distance short of said bottom wall whereby an annular clearance between said bottom wall and said seal unit is established and maintained, the radially inner portion of said elastic body which is free from said reinforcement overlying and bearing against said sloping surface, said reinforcement bearing against one of the side walls of said groove and said body resiliently bearing against the other side wall of said groove, whereby said seal unit does not impose a load in a radial direction upon said first bearing member.

3. In an oil-tight bearing having a first bearing member and a concentric second bearing member, with said first bearing member being formed with a radially-extending annular groove having a bottom wall and first and second side walls, and said second bearing member being formed with a sloping annular surface, a bearing seal unit disposed between said bearing members, said seal unit being formed with an annular elastic body with a rigid annular reinforcement disposed along one side of its axially outer portion, said body and said reinforcement being integrally united and being dimensioned in thickness such that the unit has a substantially uniform thickness substantially throughout its radial length between said members, all of the radially outer portions of said body and said reinforcement substantially coinciding and extending into said groove but terminating at a distance short of said bottom wall whereby an annular clearance between said bottom wall and said seal unit is established and maintained, the radially inner portion of said elastic body which is free from said reinforcement overlying and bearing against said sloping surface, said reinforcement bearing directly against one of the side walls of said groove and said body resiliently bearing against the other side wall of said groove, whereby said seal unit does not impose a load in a radial direction upon said first bearing member.

References Cited in the file of this patent

UNITED STATES PATENTS

| | | |
|---|---|---|
| 2,275,996 | Searles | Mar. 10, 1942 |
| 2,467,049 | Peterson | Apr. 12, 1949 |
| 2,591,129 | Browner | Apr. 1, 1952 |
| 2,734,757 | Martin | Feb. 14, 1956 |
| 2,759,778 | Anderson | Aug. 21, 1956 |

FOREIGN PATENTS

| | | |
|---|---|---|
| 465,991 | Italy | Oct. 8, 1951 |